United States Patent [19]
Boskovic

[11] Patent Number: 5,850,670
[45] Date of Patent: Dec. 22, 1998

[54] ADJUSTABLE LEADER PIN BUSHING FOR PLASTIC MOLD

[76] Inventor: Borislav Boskovic, 2102 Bannockburn, Inverness, Ill. 60067

[21] Appl. No.: 986,664

[22] Filed: Dec. 8, 1997

Related U.S. Application Data

[63] Continuation-in-part of Ser. No. 761,019, Dec. 5, 1996, Pat. No. 5,694,661.

[51] Int. Cl.⁶ .................................................. F16L 5/00
[52] U.S. Cl. .................................................. 16/2.1
[58] Field of Search .................... 16/2.1, 2.2, 2.5; 248/634, 635

[56] References Cited

U.S. PATENT DOCUMENTS

| | | | |
|---|---|---|---|
| 2,209,274 | 7/1940 | Jaberg | 16/2.1 |
| 2,428,932 | 10/1947 | Fawick | 16/2.1 |
| 2,787,486 | 4/1957 | Thiry | 16/2.1 |
| 3,801,209 | 4/1974 | Matsuoka | 16/2.1 |
| 3,890,458 | 6/1975 | Mooney | 16/2.1 |
| 4,513,954 | 4/1985 | Cantamessa | 16/2.1 |

*Primary Examiner*—Chuck Y. Mah
*Attorney, Agent, or Firm*—Lee, Mann, Smith, McWilliams, Sweeney & Ohlson

[57] ABSTRACT

An adjustable bushing to accommodate a leader pin of a plastic mold. The adjustable bushing comprises a cylindrical body having a liner installed therewithin. The liner is smaller in outer diameter than the inner diameter of the body creating a gap between the liner and the body so that the liner can shift relative to the body when engaging a leader pin. The liner is held in place against an extending internal ledge of the body by a removable cap. In one form of the invention, compressible O-rings about the liner maintain the liner in a centered orientation in the body. In another form of the invention, a resilient member is employed to axially bias the liner to retain it in place.

17 Claims, 2 Drawing Sheets

ADJUSTABLE LEADER PIN BUSHING FOR PLASTIC MOLD

RELATED APPLICATION

This application is a continuation-in-part of co-pending U.S. patent application Ser. No. 08/761,019, filed Dec. 5, 1996, now U.S. Pat. No. 5,694,661.

BACKGROUND OF THE INVENTION

This invention relates to plastic molds, and in particular to an adjustable bushing for one half of a mold to accommodate a leader pin from the other.

A typical plastic mold consists of two basic metal parts—a core half and a cavity half. During the molding operation, the mold is heated or cooled as required, which causes expansion or contraction of the mold portions. Often, a temperature differential between the core and the cavity can exceed 100° F. Thus, a mold which has properly aligned leader pins when the mold is cool, often has misaligned leader pins when the mold is hot. Misalignment can cause galling between the leader pins and the bushings in which the pins are inserted when the mold portions are closed. When damage occurs, either the leader pins or the bushings, or both, must be replaced.

SUMMARY OF THE INVENTION

The invention relates to an adjustable bushing for accommodating leader pins. In one form of the invention, the adjustable bushing comprises a cylindrical body having a predetermined internal diameter. Means is provided at one end of the body to form an internal ledge. A cylindrical liner is located within the cylindrical body, the liner having a predetermined external diameter less than the predetermined internal diameter of the cylindrical body, forming a gap between the liner and the body. A removable cap is secured to the other end of the body, the cap having an internal projection complementary to the internal ledge at the other end of the body, and the liner is sandwiched between the ledge and the projection to hold it in place.

In accordance with preferred forms of the invention, the liner has a predetermined wall thickness. The internal projection of the cap is generally circular, and has an overhang into the body not greater than the wall thickness. Similarly, the ledge extending from the cylindrical body is generally circular, and also has an overhang into the body not greater than the wall thickness.

The cap is threadedly secured to the cylindrical body. Means is provided for facilitating removal of the cap from the body, that means preferably comprising opposite indentations on the cap.

In one form of the invention the liner includes at least one external groove. A compressible ring is located in each groove to center the liner in the body, but since the rings are compressible, the liner can be shifted relative to the body to accommodate a misaligned leader pin.

In all illustrated forms of the invention, the internal projection of the cap and the internal ledge extending from the body both extend the same distance into the body. The internal ledge is an integral extension of the body.

In a second form of the invention, the adjustable bushing comprises a housing body having predetermined internal width dimensions and means at one end forming an internal ledge. A liner is provided within the housing body, the liner having predetermined external width dimensions less than the predetermined internal width dimensions, forming a gap between the liner and the housing body. A removable cap is secured to the other end of the housing body, with the cap having an internal projection complementary to the ledge, the liner being located between the ledge and the projection. Means axially biasing the liner is provided between the ledge and the projection.

In accordance with this form of the invention, the biassing means comprises a resilient member. In one form, the resilient member comprises at least one protuberance located on at least one of the ledge and the projection. Preferably, there are a plurality of the protuberances, with each protuberance comprising a spring member. In a second form, the resilient member comprises a compression element. Normally, the housing body and the liner are generally cylindrical, and the compression element comprises a compression ring. In the preferred form, the compression ring is generally serpentine to provide its compressibility.

BRIEF DESCRIPTION OF THE DRAWINGS

The invention is described in greater detail in the following description of examples embodying the best mode of the invention, taken in conjunction with the drawing figures, in which.

DESCRIPTIONS OF EXAMPLES

Embodying the Best Mode of the Invention

Figure 1:
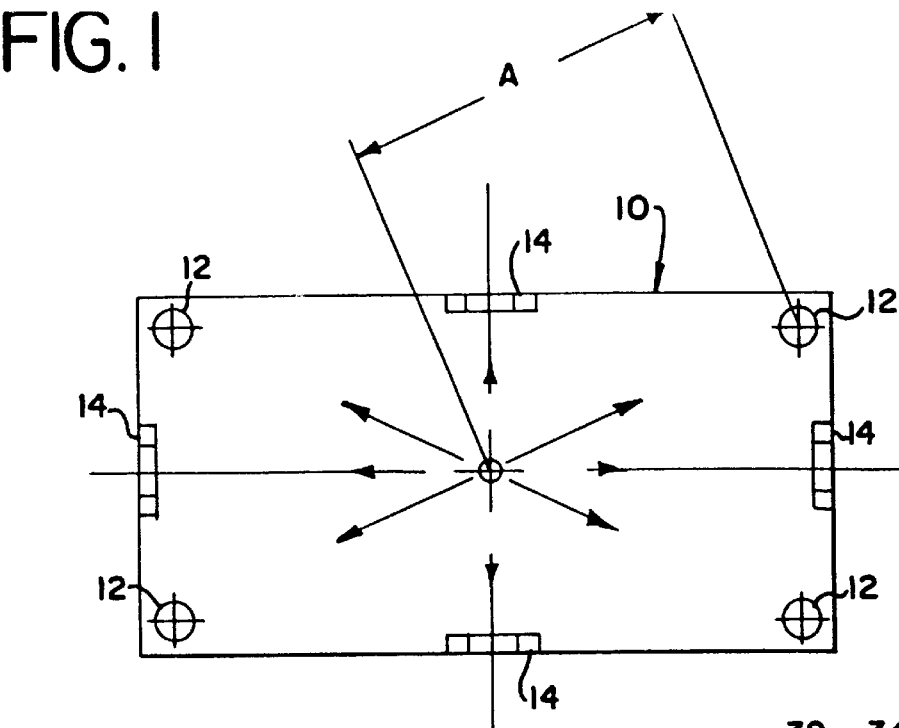
FIG. 1 is a top plan view of a mold half and illustrating apertures where leader pin bushings are installed, and also showing schematically the direction of mold expansion due to heating.

A mold half is shown schematically in FIG. 1 and designated generally at 10. The mold half can be either the core or the cavity, and as is typical, includes a series of apertures 12 at the corners thereof for leader pin bushings. The other half of the mold (not illustrated) conforms to the mold half 10, and would include, among other things, leader pins in alignment with bushings installed in the apertures 12. The mold half 10 also includes a series of guide portions 14 of locks used for joining mold halves, in a conventional fashion.

As illustrated in FIG. 1, heat expansion of the mold half 10 radiates outwardly from the center of the mold half. Thus, the corners of the mold half, where the apertures 12 are located, experience the greatest expansion. For example, the expansion between the center of the mold and one of the apertures 12, designated "A" in FIG. 1, can be significant. The co-efficient of expansion for steel is 0.0000065 per inch per degree Fahrenheit. Thus, for a 100° differential, the expansion for a ten inch dimension "A" is 0.0065 inches, for a 20 inch "A" is 0.0130 inches and for a 30 inch "A" is 0.0195 inches. These can be significant differentials in a plastic mold, where precise dimensions are demanded.

Figure 2:
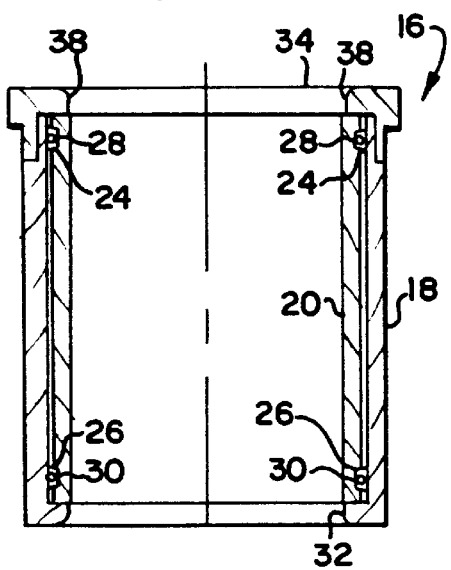
FIG. 2 is an enlarged cross-sectional illustration of an adjustable bushing according to the invention which can be installed in one of the bushing apertures of FIG. 1.
Figure 3:
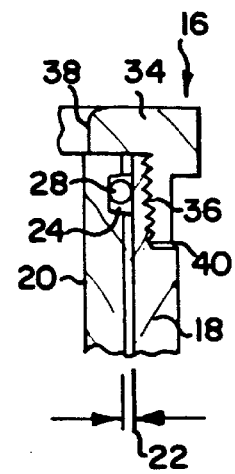
FIG. 3 is a further enlarged partial cross section of one corner of the adjustable bushing illustrated in FIG. 2, showing additional detail.
Figure 4:
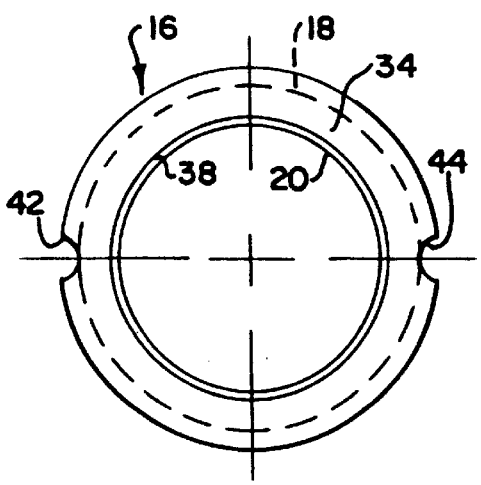
FIG. 4 is a top plan view of the adjustable bushing shown in FIG. 2.

One form of the adjustable leader pin bushing according to the invention, for accommodating such expansion, is shown in FIGS. 2 through 4, and is designated generally at 16. The bushing 16 is composed of a generally cylindrical body 18 having a cylindrical liner 20 installed therewithin. As illustrated in FIGS. 2 and 3, the cylindrical liner 20 has an external diameter less than the internal diameter of the cylindrical body 18 so that a gap 22, depicted schematically in FIG. 3, is formed between the liner 20 and the body 18. The gap 22 is formed circumferentially around the liner 20.

To orient the liner 20 centrally within the body 18, the liner 20 includes a pair of external circumferential grooves 24 and 26. A compressible ring 28 and 30, such as an O-ring, is located in a respective groove 24 and 26 to maintain the liner normally at a central orientation within the body 18 with the gap 22 formed thereabout.

The liner 20 preferably has a generally constant wall thickness, as depicted in the cross section in the drawing figures. The body 18 includes an annular internal ledge 32 extending into the interior of the body 18 and forming a shelf upon which the liner 20 bears. The ledge 32 extends into the interior of the body 18 a distance no greater than the wall thickness of the liner 20.

Similarly, the opposite end of the body 18 is topped by an annular cap 34. The cap 34 is applied to the body 18 by means of a threaded connection 36 (FIG. 3). The cap 34 includes an annular internal projection 38 extending into the interior of the body 18, and as best shown in FIG. 3, the projection is generally circular and extends into the body 18 a distance not greater than the wall thickness of the liner 20. It is preferred that the ledge 32 and the projection 38 be substantially identical and complementary to one another, with the ledge 32 being an integral extension of the material of the body 18 and the liner 20 firmly sandwiched between the ledge 32 and the projection 38.

As shown in FIG. 3, a slight gap 40 occurs between the cap 34 and the body 18. This is for adjustment purposes, so that the cap 34 can be tightened as much as desired on the liner 20 to maintain the liner 20 in place. For facilitating tightening and removal of the cap 34, the cap includes opposite indentations 42 and 44, as illustrated in FIG. 4, which can be engaged by an appropriate tool for rotating the cap 34 relative to the body 18.

The adjustable leader pin bushing 16 is assembled by first installing the compressible rings 28 and 30 in their respective grooves 24 and 26 in the liner 20. The liner 20 is then installed in the cylindrical body 18, bottomed against the internal ledge 32. The cap 34 is then applied, with the liner 20 sandwiched between the ledge 32 and the projection 38, and the cap 34 is tightened as much as desired. The bushing 16 is then installed in one of the apertures 12 of the mold half 10. Similar bushings are installed in the remaining three apertures 12.

The leader pins of the typical plastic mold are sized to fit snugly within the internal dimension of the liner 20. If perfect alignment occurs, the liner 20 remains centered within the body 18, as illustrated in the drawing figures. However, if there is misalignment between the pin and the bushing 16, as the pin enters the liner 20, the liner 20 is shifted in the direction of misalignment by compressing the rings 28 and 30 between the liner 20 and the body 18. The liner 20 can therefore shift as much as the width of the cap 22 to accommodate misalignment between the leader pin and the bushing 16.

It is preferred that the compressible rings 28 and 30 be made of any compressible material having a capacity to accommodate temperatures experienced by a typical plastic mold. The remaining portions of the bushing 16 are preferably metal, and since the cap 34 is removable, a series of interchangeable liners 20 can be provided. The liners 20 can be made of different materials, such as hardened steel, bronze alloys, or Teflon coated steel.

Figure 5:
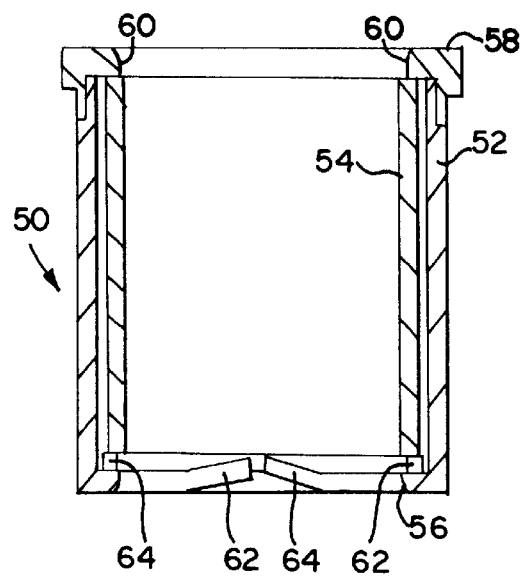
FIG. 5 is an enlarged cross-sectional illustration of a second form of an adjustable bushing according to the invention which can be installed in one of the bushing apertures of FIG. 1.
Figure 6:
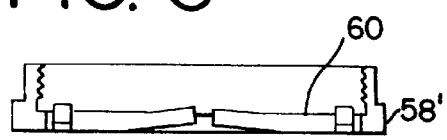
FIG. 6 is a cross-sectional illustration of a portion of another form of the invention where the biasing means is located in the cap for the bushing.
Figure 7:
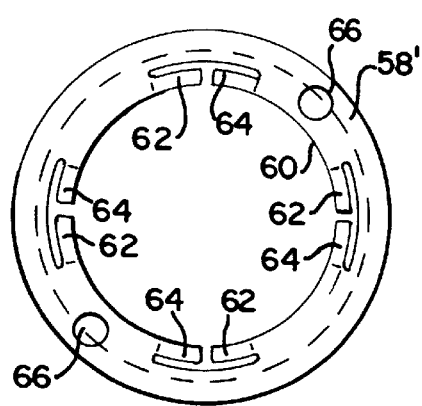
FIG. 7 is a top plan view of the cap illustrated in FIG. 6.

A second form of the adjustable leader pin bushing according to the invention is shown in FIG. 5, with a different embodiment of this form being shown in FIGS. 6 and 7. Returning to FIG. 5, the bushing is depicted generally at 50. The bushing is composed of a generally cylindrical body 52 having a cylindrical liner 54 installed therewithin, very similar to the manner illustrated in the first form of the invention so that a gap is formed between the liner 54 and the body 52. The gap is formed circumferentially around the liner 54 in precisely the same manner as described in relation to the first form of the invention.

The liner 54 preferably has a generally constant wall thickness, and the body 52 includes an annular internal ledge 56 extending into the interior of the body 52 and forming a shelf upon which the liner 54 bears. Similar to the first form of the invention, the ledge 56 extends into the interior of the body 18 a distance no greater than the wall thickness of the liner 54.

The opposite end of the body 52 is topped by an annular cap 58. The cap 58 is applied to the body 52 by means of a threaded connection, similar to the first form of the invention, or by any other appropriate means. The cap 58 includes an annular internal projection 60 extending into the interior of the body 52. Preferably the projection 60 is generally circular and extends into the body 52 a distance not greater than the wall thickness of the liner 54.

Similar to the first form of the invention, the liner 54 is resiliently biased between the ledge 56 and the projection 60. However, in this form of the invention, no O-rings are employed. Instead, the axial dimension of the liner 54 is less than the axial dimension between the ledge 56 and the projection 60, and instead the ledge 56 employs a series of protuberances comprising upstanding spring members 62 and 64. Preferably, four of the pairs of spring members 62 and 64 are employed, spaced at 90° intervals about the ledge 56.

FIGS. 6 and 7 are similar to FIG. 5, except that the protuberances are formed in the projection 60 of the cap 58' rather than in the ledge 56. Thus, the ledge 56 in this form of the invention could be identical to the ledge 32 illustrated in the first form of the invention, with the axially biasing being due to protuberances in the form of spring members 62 and 64 in the projection 60 of the cap 58'. Remaining portions of the bushing would otherwise be identical to that described above. FIG. 7 also illustrates a pair of indentations 66 which can be used for rotating the cap 58' when it is applied to the body 52, similar to the indentations 42 and 44 shown in FIG. 4.

As a further alternative form of the invention, the cap 58' can replace the cap 58 illustrated in FIG. 5, so that both the projection 60 and the ledge 56 employ the spring members 62. Other similar means of biasing can be employed so that the liner 54 is held firmly between the projection 60 and the ledge 56, and can be shifted by a leader pin as described in relation to the first form of the invention shown in FIGS. 1–4.

Figure 8:
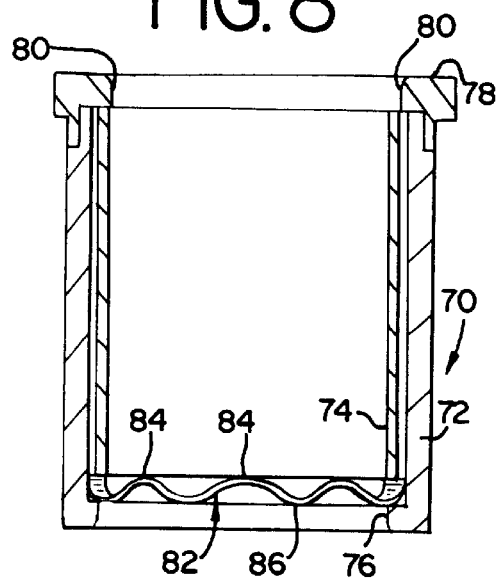
FIG. 8 is a cross-sectional illustration of yet another form of an adjustable bushing according to the invention which can be installed in one of the bushing apertures of FIG. 1.
Figure 10:
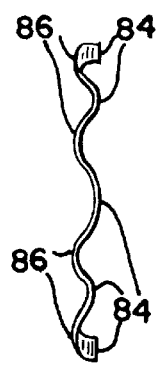
FIG. 10 is a side elevational illustration of the spring member depicted in FIG. 9.
Figure 9:
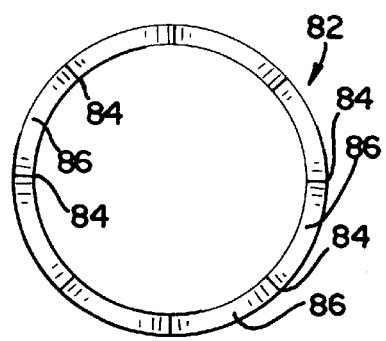
FIG. 9 is a top plan view of the spring member utilized in the adjustable bushing of FIG. 8.

In yet a further form of the invention illustrated in FIGS. 8 through 10, a bushing according to the invention is generally depicted at 70. The bushing 70, similar to the first forms of the invention, is composed of a generally cylindrical body 72 having a cylindrical liner 74 installed therewithin. The cylindrical liner 74 has an external dimension less than the internal dimension of the body 18 so that a gap is formed between the liner 74 and the body 72, in exactly the same manner as described in relation to the earlier forms of the invention.

The body 72 includes an annular internal ledge 76 extending into the interior of the body and forming a shelf as illustrated. Preferably the ledge 76 extends into the interior of the body 72 a distance no greater than the wall thickness of the liner 74.

In the same manner as the first forms of the invention, the opposite end of the body 72 is topped by an annular cap 78. The cap 78 includes an annular internal projection 80 extending into the interior of the body 72, and again the projection 80 extends into the body 72 a distance no greater than the wall thickness of the liner 74. It is preferred that the ledge 76 and the projection 80 be substantially identical and complementary to one another, with the ledge 76 being an integral extension of the material of the body 72 with the liner located between the ledge 76 and the projection 80.

In this form of the invention, the liner 74 is shorter in the axial dimension than the distance between the ledge 76 and the projection 80, leaving a spacing. Filling this spacing is a resilient member in the form of a compression element 82. As illustrated, the compression element 82 is in the form of a compression ring, which is serpentine, having undulating hills 84 and valleys 86, with the hills 84 bearing against the bottom of the liner 74 and the valleys bearing against the ledge 76. Similarly, the compression element 82 can be located between the projection 80 and the top of the liner 74, or a pair of the compression elements 82 can be employed, one bearing between the bottom of the liner 74 and the ledge 76 and the other bearing between the top of the liner 74 and the projection 80. As best illustrated in FIG. 9, eight hills 84 and valleys 86 are preferably utilized, although any number of hills and valleys can be employed depending on the desired compressibility of the compression element 82.

In the forms of the invention illustrated in FIGS. 5 through 10, all portions of the invention are preferably made of metal. Alternatively, other materials, such as high temperature plastics, can also be employed.

Various changes can be made to the invention without departing from the spirit thereof or scope of the following claims.

What is claimed is:

1. An adjustable bushing, comprising
   a. a housing body having predetermined internal width dimension,
   b. means at one end of said housing body forming an internal ledge,
   c. a liner within said housing body, said liner having predetermined external width dimensions less than said predetermined internal width dimensions, forming a gap between said liner and said body,
   d. a removable cap secure to the other end of said housing body, said cap having an internal projection complementary to said ledge, said liner being located between said ledge and said projection, and
   e. means axially biassing said liner between said ledge and said projection.

2. An adjustable bushing according to claim 1 in which said biassing means comprises a resilient member.

3. An adjustable bushing according to claims 2 in which said resilient member comprises at least one protuberance located on at least one of said ledge and said projection.

4. An adjustable bushing according to claim 3 in which said protuberance comprises a spring member.

5. An adjustable bushing according to claim 3 including a plurality of said protuberances.

6. An adjustable bushing according to claim 5 in which each protuberance comprises a spring member.

7. An adjustable bushing according to claim 2 in which said resilient member comprises a compression element.

8. An adjustable bushing according to claim 7 in which said housing body and said liner are generally cylindrical, and said compression element comprises a compression ring.

9. An adjustable bushing according to claim 8 in which said compression ring is serpentine.

10. An adjustable bushing according to claim 1 in which said housing body and said liner are generally cylindrical.

11. An adjustable bushing according to claim 10 in which said liner has a predetermined wall thickness.

12. An adjustable bushing according to claim 11 in which said projection is generally circular, having an overhang into said body not greater than said wall thickness.

13. An adjustable bushing according to claim 11 in which said ledge is generally circular, having an overhang into said body not greater than said wall thickness.

14. An adjustable bushing according to claim 10 in which said cap is threadedly secured to said other end.

15. An adjustable bushing according to claim 14 including means facilitating removal of said cap from said body.

16. An adjustable bushing according to claim 15 in which said facilitating means comprises opposite indentations on said cap.

17. An adjustable bushing according to claim 1 in which said internal ledge is an integral extension of said body.

\* \* \* \* \*